United States Patent
Sato

(10) Patent No.: US 12,278,576 B2
(45) Date of Patent: Apr. 15, 2025

(54) ELECTRIC MOTOR DRIVE DEVICE

(71) Applicant: TMEIC Corporation, Chuo-ku (JP)

(72) Inventor: Hirotaka Sato, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 49 days.

(21) Appl. No.: 18/040,666

(22) PCT Filed: Aug. 24, 2020

(86) PCT No.: PCT/JP2020/031813
§ 371 (c)(1),
(2) Date: Feb. 6, 2023

(87) PCT Pub. No.: WO2022/044070
PCT Pub. Date: Mar. 3, 2022

(65) Prior Publication Data
US 2023/0308036 A1   Sep. 28, 2023

(51) Int. Cl.
*H02P 21/22* (2016.01)
*H02P 21/34* (2016.01)
*H02P 27/08* (2006.01)

(52) U.S. Cl.
CPC ............. *H02P 21/22* (2016.02); *H02P 21/34* (2016.02); *H02P 27/08* (2013.01); *H02P 2205/01* (2013.01)

(58) Field of Classification Search
CPC ........... H02P 21/22; H02P 21/34; H02P 27/08
See application file for complete search history.

(56) References Cited

U.S. PATENT DOCUMENTS

2019/0235960 A1* 8/2019 Saito ..................... G06F 12/16

FOREIGN PATENT DOCUMENTS

| JP | 1-129786 A | 5/1989 |
| JP | 2-114889 A | 4/1990 |
| JP | 2013-39033 A | 2/2013 |

OTHER PUBLICATIONS

International Search Report issued Oct. 27, 2020 in PCT/JP2020/031813, filed on Aug. 24, 2020, 4 pages (with English translation).

* cited by examiner

*Primary Examiner* — Said Bouziane
(74) *Attorney, Agent, or Firm* — Oblon, McClelland, Maier & Neustadt, L.L.P.

(57) ABSTRACT

An electric motor drive device that includes an electric motor, a main circuit, a current sensor, and a control unit. The electric motor has a plurality of windings. The main circuit transforms power into AC power and supplies the AC power to each of the plurality of windings. The current sensor detects a load current flowing through each of the windings. The control unit controls the main circuit on the basis of a current value detected by the current sensor and controls an amount of power to be supplied from the main circuit to the electric motor on the basis of an amplitude of the load current associated with detection of an undervoltage state of the AC power supply in a state in which the main circuit uses conversion rule in which an index value for the amplitude of the load current flowing through the plurality of windings is defined.

8 Claims, 11 Drawing Sheets

| CURRENT RANGE | TABLE NUMBER ix | REFERENCE DC VOLTAGE VFR0 |
|---|---|---|
| 0-IFCHG1 | 1 | VFR1 |
| -IFCHG2 | 2 | VFR2 |
| ⋮ | ⋮ | ⋮ |
| -IFCHG5 | 5 | VFR5 |

ELECTRIC MOTOR DRIVE DEVICE

TECHNICAL FIELD

An embodiment of the present invention relates to an electric motor drive device.

BACKGROUND ART

An electric motor drive device transforms power supplied from an alternating current (AC) power supply and drives a multiphase AC motor (simply referred to as an electric motor) using AC power after the transformation. Because the voltage of the AC power supply is not stable, the electric motor drive device may detect a voltage drop state (an undervoltage state) on an AC power supply side. A power failure and instantaneous drop are examples of the undervoltage state. When a voltage drop state is detected, the electric motor drive device temporarily suspends the supply of AC power to the electric motor and resumes the supply of AC power when the voltage drop state is eliminated. Meanwhile, when the electric motor drive device resumes the supply of AC power as described above and restarts the electric motor, the load of the electric motor drive device suddenly changes and an overcurrent of an amplitude that affects the operation of the electric motor drive device and the electric motor may occur.

CITATION LIST

Patent Document

[Patent Document 1]
  Japanese Unexamined Patent Application, First Publication No. 2013-39033

SUMMARY OF INVENTION

Technical Problem

An objective of the present invention is to provide an electric motor drive device capable of further improving the convenience when an electric motor is restarted.

Solution to Problem

According to an embodiment, an electric motor drive device includes an electric motor, a main circuit, a current sensor, and a control unit. The electric motor has a plurality of windings. The main circuit transforms power of an AC power supply into AC power and supplies the AC power to each of the plurality of windings. The current sensor detects a load current flowing through each of the plurality of windings. The control unit controls the main circuit on the basis of a current value detected by the current sensor. The control unit controls an amount of power to be supplied from the main circuit to the electric motor on the basis of an amplitude of the load current associated with detection of an undervoltage state of the AC power supply in a state in which the main circuit uses a conversion rule in which an index value for the amplitude of the load current flowing through the plurality of windings is defined.

DESCRIPTION OF EMBODIMENTS

Hereinafter, an electric motor drive device of an embodiment will be described with reference to the drawings.

In the following description, a variable-speed electric motor drive device is simply referred to as an electric motor drive device. Also, the same reference signs denote components having the same or similar functions. Redundant description of those components may be omitted. Also, an electrical connection may simply be referred to as a "connection." "PWM control" shown in the following description refers to pulse width modulation control and may be referred to simply as PWM. For the PWM control, a carrier comparison PWM scheme using a carrier wave that is a triangular wave or a serrated wave may be applied. "Fundamental wave" refers to a component with a lowest frequency in a specific AC voltage waveform. In the embodiment, an "undervoltage state of an AC power supply" is a state in which an effective value of the AC voltage is less than or equal to a prescribed value, and includes a so-called power failure state, an instantaneous drop state, or the like. A "speed" in the embodiment is an angular velocity and the angular velocity of a rotor of an electric motor is simply referred to as a "speed."

Figure 1:
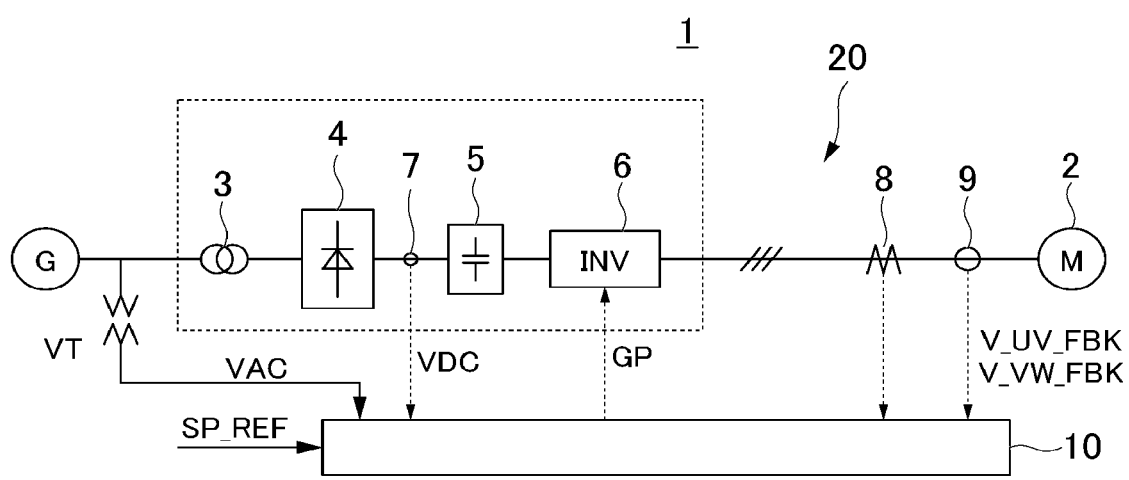
FIG. 1 is a configuration diagram of an electric motor drive device according to an embodiment.

FIG. 1 is a configuration diagram of an electric motor drive device 1 of the embodiment.

The electric motor drive device 1 includes, for example, an electric motor 2, a transformer 3, a rectifier 4, a capacitor 5, an inverter 6, a DC voltage sensor 7, a current sensor 8, an AC voltage sensor 9, and a control unit 10.

The electric motor 2 (M) has a plurality of windings. For example, the electric motor 2 has three windings to which three-phase AC power is supplied. The three windings are connected in a star type (Y-connection type) within the electric motor 2. The electric motor 2 may be, for example, an induction motor but is not limited thereto. Each unit of the electric motor drive device 1 drives the electric motor 2 on the basis of AC power supplied from an AC power supply G.

The transformer 3 transforms a voltage of AC power supplied from the AC power supply G (referred to as a power supply voltage) into a prescribed voltage. An instrument transformer VT is provided on the primary side of the transformer 3. The instrument transformer VT detects an AC voltage based on the primary power supply voltage of the transformer 3 and outputs a feedback input voltage VAC.

The rectifier 4 rectifies the AC power supplied from the AC power supply G and outputs a desired voltage (DC voltage) between a negative electrode N and a positive electrode P of a DC link connected to an output. For example, the capacitor 5 smooths the voltage between the negative electrode N and the positive electrode P of the DC link. The inverter 6 converts DC power supplied via the DC link into AC power and outputs the AC power.

For example, the DC voltage sensor 7 detects a voltage applied to the DC link and outputs a feedback DC voltage VDC corresponding thereto. For example, the DC voltage sensor 7 may detect the voltage between the negative electrode N and the positive electrode P of the DC link.

The current sensor 8 detects a phase current flowing in each phase of multiphase AC on an output side of the inverter 6 and outputs a feedback current corresponding thereto. The current transformer CT is an example of the current sensor 8.

The AC voltage sensor 9 detects a line voltage (a voltage between the two lines) of each phase of the multiphase AC on the output side of the inverter 6. For example, the AC voltage sensor 9 detects an AC voltage between two lines, a U-phase line LU (FIG. 3) and a V-phase line LV (FIG. 3), of three-phase AC and outputs the detected AC voltage as a feedback output voltage V_UV_FBK. The AC voltage sensor 9 detects an AC voltage between two lines, the V-phase line LV and a W-phase line LW (FIG. 3), and outputs the detected AC voltage as a feedback output voltage V_VW_FBK.

The control unit 10 sends a gate pulse GP to the inverter 6 on the basis of a reference speed SP_REF and controls an amount of power conversion by the inverter 6. For example, the control unit 10 may control the inverter 6 on the basis of detection results of the sensors including the DC voltage sensor 7, the current sensor 8, the AC voltage sensor 9, and the instrument transformer VT. In the following description, a case where the control unit 10 performs a variable voltage variable frequency (VVVF) control process for the electric motor 2 will be described.

Figure 2:
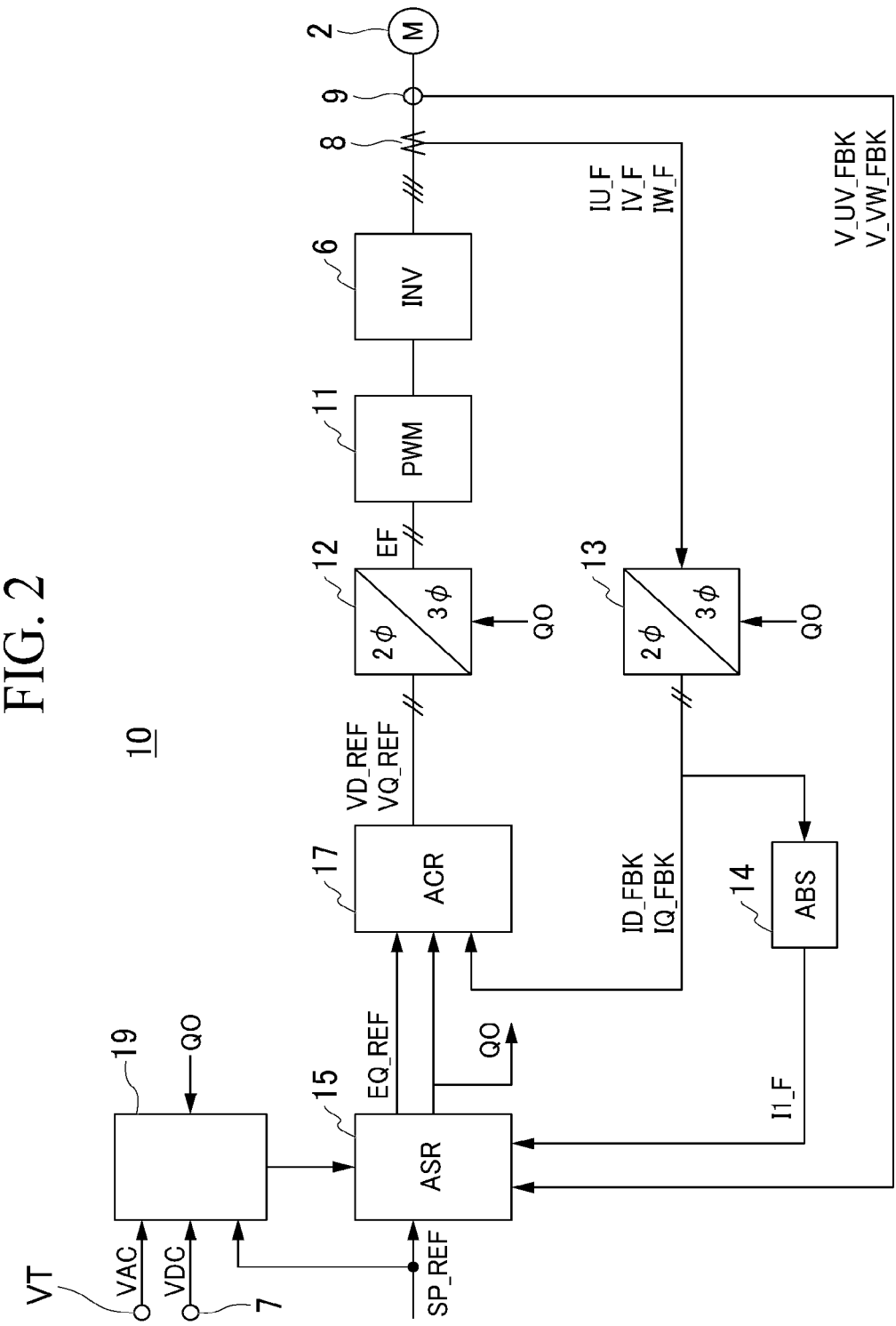
FIG. 2 is a configuration diagram of a control unit of the embodiment.

FIG. 2 is a configuration diagram of the control unit 10 of the embodiment.

The control unit 10 includes a PWM control unit 11 (denoted by PWM in FIG. 2), an inverse DQ transformation unit 12, a DQ transformation unit 13, an absolute value calculation unit 14 (denoted by ABS in FIG. 2), a speed control unit 15 (denoted by ASR in FIG. 2), a current control unit 17 (denoted by ACR in FIG. 2), and a monitoring unit 19.

The PWM control unit 11 generates a gate pulse GP for controlling the inverter 6 according to PWM control based on a voltage command ER and a triangle wave carrier Car which will be described below.

The inverse DQ transformation unit 12 transforms a signal of a rotational coordinate system having a d-axis and a q-axis orthogonal to each other (referred to as a dq coordinate system) into a signal of a stationary coordinate system having three axes associated with each of uvw phases (referred to as a uvw coordinate system) in a prescribed calculation process using a reference phase QO. The voltage command ER is an example of a signal in the uvw coordinate system.

The DQ transformation unit 13 transforms a signal of the uvw coordinate system into a signal of the dq coordinate system in a prescribed calculation process using the reference phase QO. A transformation process of the inverse DQ transformation unit 12 is an inverse process of a transformation process of the DQ transformation unit 13.

For example, the DQ transformation unit 13 generates a d-axis feedback current ID_FBK and a q-axis feedback current IQ_FBK on the basis of an instantaneous value of a phase current detected by the current sensor 8. Instantaneous values of phase currents detected by the current sensors 8 are denoted by IU_F, IV_F, and IW_F. Also, values for at least two phases among values of these three phases may be provided.

The absolute value calculation unit 14 generates a current value indicating an amplitude of the current detected by the current sensor 8. An output current I1_F is an example of the current value. The output current I1_F may be a root of a sum of squares of the d-axis feedback current ID_FBK and the q-axis feedback current IQ_FBK.

The speed control unit 15 generates a speed correction signal EQ_REF obtained by correcting a reference speed SP_REF and the reference phase QO on the basis of the reference speed SP_REF that defines the speed of the electric motor 2, the line voltage detected by the AC voltage sensor 9, and the output current I1_F. The feedback output voltage V_UV_FBK and the feedback output voltage V_VW_FBK are examples of two line voltages detected on the basis of the AC voltage sensor 9. The reference phase QO corresponds to an angle formed by a reference axis of the dq coordinate system and a reference axis of the uvw coordinate system. Details of the speed control unit 15 will be described below. Also, when the electric motor 2 is an induction motor, the speed control unit 15 may estimate a slip angle frequency and correct the reference phase QO on the basis of the slip angle frequency.

The current control unit 17 generates a reference d-axis voltage VD_REF and a reference q-axis voltage VQ_REF on the basis of the speed correction signal EQ_REF, the d-axis feedback current ID_FBK, the q-axis feedback current IQ_FBK, and the reference phase QO. The reference d-axis voltage VD_REF and the reference q-axis voltage VQ_REF become input signals of the inverse DQ transformation unit 12.

The monitoring unit 19 monitors a control state on the basis of the output current I1_F, the AC voltage VAC, which is a detection result of the primary-side voltage of the transformer 3, the DC voltage VDC, the reference speed SP_REF, and the reference phase QO.

For example, the monitoring unit 19 detects a power failure (an undervoltage state) of the AC power supply G and power restoration (elimination of the undervoltage state) on the basis of the AC voltage VAC and outputs a restart signal A and a restart signal B to be described below according to the above-described states. The monitoring unit 19 detects whether or not the speed of the electric motor 2 is following the reference speed SP_REF on the basis of the reference speed SP_REF and the reference phase QO. For example, the monitoring unit 19 may determine that the speed of the electric motor 2 is following the reference speed SP_REF when a state in which a magnitude of a deviation between the reference speed SP_REF and the reference phase QO is less than the prescribed value continues over a prescribed period of time. When it is determined that the speed of the electric motor 2 has returned to a state that it follows the reference speed SP_REF, the monitoring unit 19 may remove the restart signal A according to a result of this determination. Also, the monitoring unit 19 may remove the restart signal B after the elapse of the prescribed period of time from the detection of the power restoration.

Figure 3:
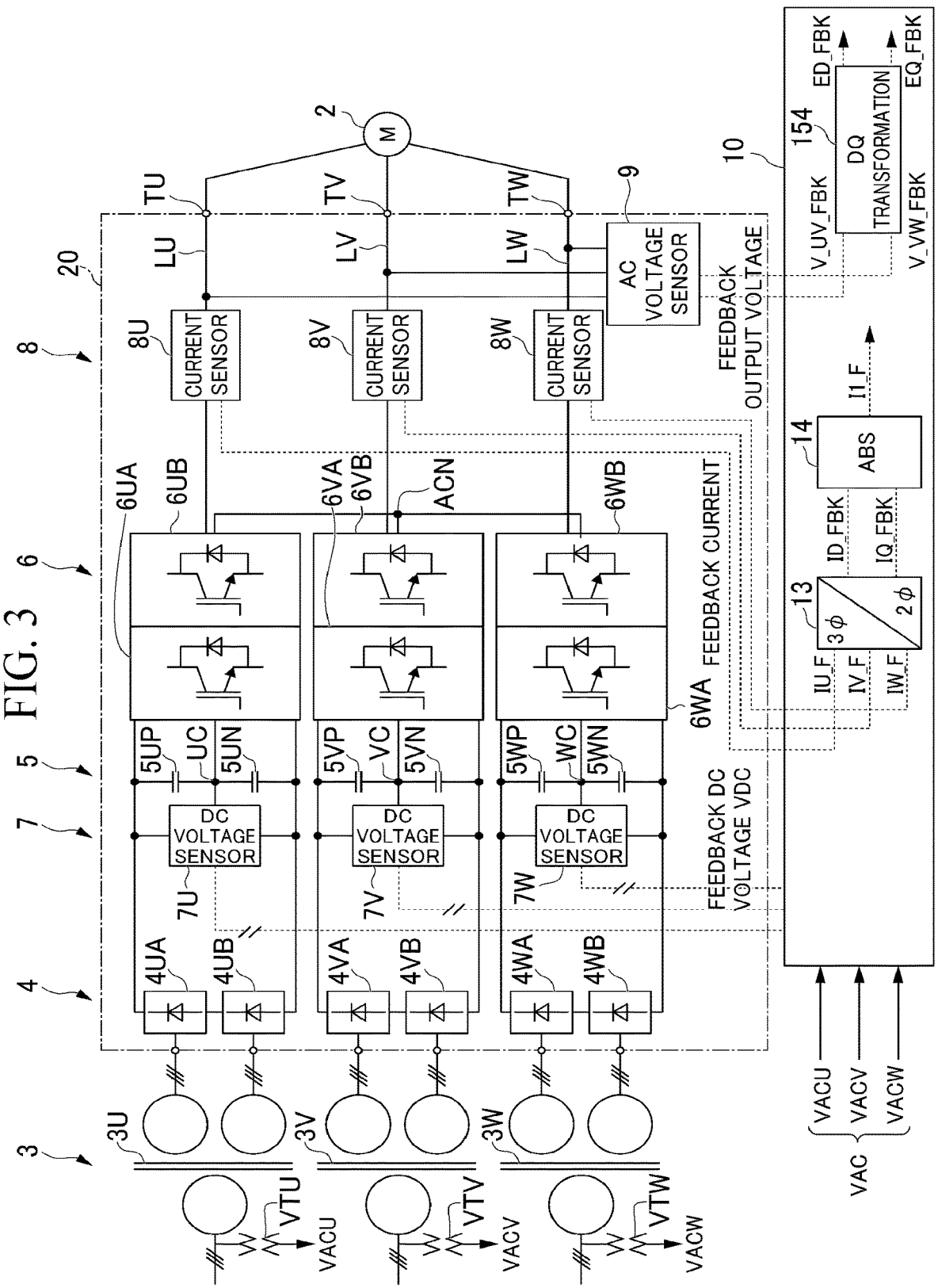
FIG. 3 is a configuration diagram of a main circuit of the embodiment.

A main circuit 20 of the embodiment will be described with reference to FIG. 3. FIG. 3 is a configuration diagram of the main circuit 20 of the embodiment.

The main circuit 20 includes, for example, the transformer 3, the rectifier 4, the capacitor 5, the inverter 6, the DC voltage sensor 7, the current sensor 8, and the AC voltage sensor 9. The DC voltage sensor 7, the current sensor 8, and the AC voltage sensor 9 may be configured outside of the main circuit 20.

For example, the main circuit 20 is independently configured for each phase of the U-phase, the V-phase, and the W-phase. The component of each phase is denoted by adding the letter U, V, or W to the reference sign of the component shown in FIG. 1. Furthermore, the component of the positive electrode side is identified by adding the letter P and the component of the negative electrode side is identified by adding the letter N. Also, components having an equal relationship regardless of the polarity of the direct current are identified by adding the letter A or B.

Here, the U-phase will be described as an example.

The transformer 3U includes, for example, a primary winding and two secondary windings. The AC side of a rectifier 4UA is connected to the first secondary winding via a connection terminal. The AC side of a rectifier 4UB is connected to the second secondary winding via a connection terminal. The DC side of the rectifier 4UA and the DC side of the rectifier 4UB are connected in series and both ends of the rectifier 4UA and the rectifier 4UB connected in series are connected to the positive and negative electrodes of the DC link of the U-phase, respectively. The rectifier 4UA and the rectifier 4UB rectify AC power to be supplied.

Reference sign UC denotes a neutral point of a U-phase DC system. The potential of the neutral point UC is an intermediate potential between the positive and negative electrodes of the U-phase DC link. The terminals of both poles of a capacitor 5UP are connected to the positive electrode of the U-phase DC link and the neutral point UC. The terminals of both poles of a capacitor 5UN are connected to the negative electrode of the U-phase DC link and the neutral point UC.

The inverter 6 includes, for example, a leg 6UA and a leg 6UB, and is configured in a full bridge type. The inverter 6 may be configured to have a single-phase output type including the leg 6UA and the leg 6UB. Each leg may be of a three-level type such as an NPC type or may be of a two-level type instead thereof. Each of the leg 6UA and the leg 6UB includes a plurality of switching elements. For example, the plurality of switching elements may be aligned in the same type. The type of switching element does not matter. The switching element may be, for example, an insulated gate bipolar transistor (IGBT), a metal-oxide-semiconductor field-effect transistor (MOSFET), or the like. Reflux diodes connected in anti-parallel may be provided in the switching element.

For example, when the leg 6UA and the leg 6UB are of a neutral-point-clamped (NPC) type, they are connected to the positive and negative electrodes of the U-phase DC link and the neutral point UC, respectively. The output terminal of the leg 6UA is connected to a terminal TU. The output terminal of the leg 6UB is connected to the AC side neutral point ACN. A U-phase winding of the electric motor 2 is connected to the terminal TU.

A current sensor 8U is provided on the connection line LU from the output terminal of the leg 6UA to the terminal TU. The current sensor 8U detects a current flowing through the connection line LU and the U-phase winding of the electric motor 2.

The transformer 3U, the rectifier 4UA, the rectifier 4UB, the capacitor 5UP, the capacitor 5UN, the neutral point UC, the leg 6UA, the leg 6UB, the terminal TU, the current sensor 8U, and the connection line LU are related to the U-phase.

The transformer 3V, the rectifier 4VA, the rectifier 4VB, the capacitor 5VP, the capacitor 5VN, the neutral point VC, the leg 6VA, the leg 6VB, the terminal TV, the current sensor 8V, and the connection line LV are related to the V-phase. The configuration of the V-phase is equivalent to the configuration of the U-phase and detailed description of the V-phase refers to the description of the U-phase.

A transformer 3W, a rectifier 4WA, a rectifier 4WB, a capacitor 5WP, a capacitor 5WN, a neutral point WC, a leg 6WA, a leg 6WB, a terminal TW, a current sensor 8W, and a connection line LW are related to the W-phase. The configuration of the W-phase is equivalent to the configuration of the U-phase and detailed description of the W-phase refers to the description of the U-phase.

Components that do not belong to each of the above phases will be described.

The AC voltage sensor 9 is connected to the connection line LU, the connection line LV, and the connection line LW, respectively. For example, the AC voltage sensor 9 detects a voltage between the connection line LU and the connection line LV, a voltage between the connection line LV and the connection line LW, and a voltage between the connection line LW and the connection line LU. As described above, at least two voltages among the above-described voltages may be output.

Also, the feedback input voltage VAC may include feedback input voltages VACU, VACV, and VACW output from the instrument transformers VTU, VTV, and VTW of the phases, respectively.

Figure 4:
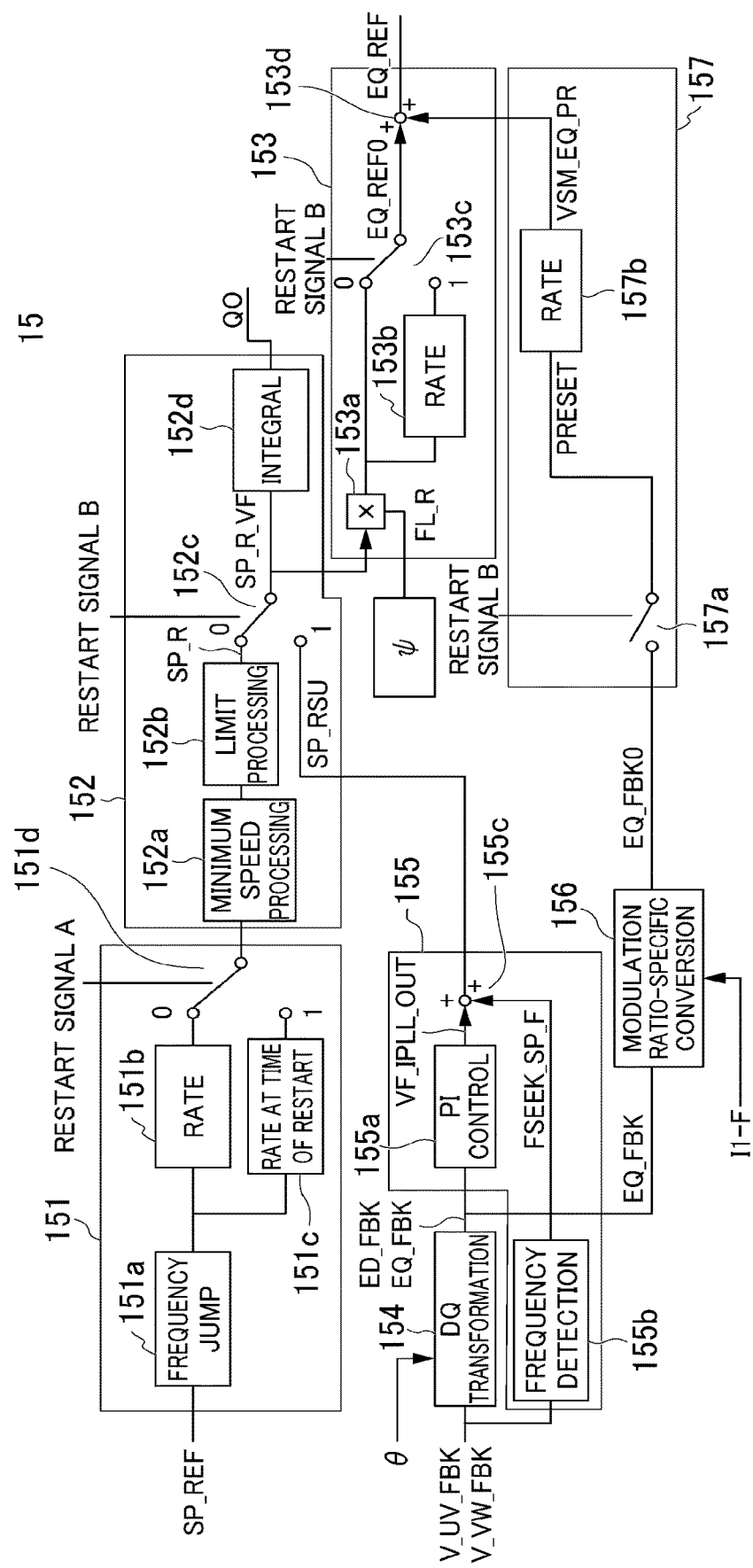
FIG. 4 is a configuration diagram of a speed control unit of the embodiment.

The speed control unit 15 of the embodiment will be described with reference to FIG. 4. FIG. 4 is a configuration diagram of the speed control unit 15 of the embodiment. The speed control unit 15 accepts the reference speed SP_REF supplied from the above-described control device.

For example, the speed control unit 15 includes a frequency correction unit 151, a speed phase setting unit 152, a frequency range regulation unit 153, a DQ transformation unit 154, a VF control unit 155, a modulation ratio-specific conversion unit 156, a feedback voltage regulation unit 157, and a magnetic flux control unit 159.

The frequency correction unit 151 corrects the reference speed SP_REF to avoid a frequency at which mechanical resonance occurs. For example, the frequency correction unit 151 includes calculation blocks 151a to 151d. The calculation block 151a performs a speed estimation calculation process by internally providing a limited frequency table where a limited frequency band is defined and corrects the reference speed SP_REF so that a frequency defined in the limited frequency table does not occur by comparing the estimated speed (frequency) and the limited frequency table. This correction is referred to as a frequency jump. A known calculation method may be used for the calculation process for estimating the above-described speed.

The calculation blocks 151b and 151c limit a change rate so that a sudden change in the signal output by the calculation block 151a is absorbed. For example, the characteristics of the calculation block 151c are set so that a system response thereof is slow as compared with characteristics of the calculation block 151b. More specifically, the characteristics of the calculation block 151c may be determined so that a signal that changes rapidly with respect to the response characteristics of the electric motor 2 is not supplied to the electric motor 2. The calculation block 151d is a switcher. The calculation block 151d selects one of the outputs of the calculation blocks 151b and the 151c on the basis of the restart signal A and outputs the selected signal. For example, the calculation block 151d selects the output of the calculation block 151b when a logical value of the restart signal A is 0 and selects the output of the calculation block 151c when the logical value of the restart signal A is 1. The logical value of the restart signal A becomes 0 at the normal time different from the restart time and becomes 1 at the time of restart.

The speed phase setting unit 152 includes calculation blocks 152a to 152d. The calculation block 152a sets a reference speed so that the minimum speed of the electric motor 2 is compensated for with respect to the reference speed corrected by the frequency correction unit 151. The calculation block 152b limits an upper limit value to the reference speed corrected by the frequency correction unit 151. The calculation block 152c is a switcher. On the basis of the restart signal B, the calculation block 152c selects either a reference speed SP_R from the calculation block 152b or a reference speed SP_RSU from the VF control unit 155 to be described below and outputs a selected signal as a reference speed SP_R_VF. For example, the calculation block 152c selects the reference speed SPR when the logical value of the restart signal B is 0, selects the reference speed SP_RSU when the logical value of the restart signal B is 1, and outputs the selected speed as the reference speed SP_R_VF. The logical value of the restart signal A becomes 0 at the normal time different from the restart time and becomes 1 at the restart time. The calculation block 152d integrates the reference speed SP_R_VF to generate the reference phase QO.

The frequency range regulation unit 153 includes calculation blocks 153a to 153d. The calculation block 153a is a multiplier. The calculation block 153a multiplies the reference speed SP_R_VF by reference magnetic flux FL_R and outputs a multiplication result. The calculation block 153b limits the change rate so that a rapid change in the signal output by the calculation block 153a is absorbed. The calculation block 153c selects either an output value of the calculation block 153a or an output value of the calculation block 153b on the basis of the restart signal B and outputs a selected signal as a reference speed EQ_REF0. For example, the calculation block 153c generates the reference speed EQ_REF0 by selecting the output value of the calculation block 153a when the logical value of the restart signal B is 0 and selecting the output value of the calculation block 153b when the logical value of the restart signal B is 1. The calculation block 153d is an adder. The calculation block 153d adds the reference speed EQ_REF0 to a correction signal VSM_EQ_PR to be described below and outputs an addition result as a reference speed EQ_REF.

The DQ transformation unit 154 acquires at least two line voltages of the two phases detected by the AC voltage sensor 9 and generates a line voltage for each axis component of the uvw coordinate system. The DQ transformation unit 154 outputs a feedback d-axis voltage ED_FBK and a feedback q-axis voltage EQ_FBK of axis components of the dq coordinate system by performing a DQ transformation process for the line voltages of the axis components according to the reference phase QO.

The VF control unit 155 includes calculation blocks 155a to 155c. For example, the calculation block 155a carries out Pt calculation having prescribed transfer characteristics. This is referred to as PI control. In other words, in the PI control, a low frequency component in the frequency band of a feedback voltage is extracted and a phase component is extracted. For example, the calculation block 155a generates a signal VF_IPLL_OUT by acquiring the feedback d-axis voltage ED_FBK and the feedback q-axis voltage EQ_FBK and carrying out the PI calculation, for example, having prescribed gain characteristics (transfer characteristics) depending on a frequency, with respect to an amplitude of the acquired feedback voltage. The calculation block 155b acquires at least two line voltages of the two phases detected by the AC voltage sensor 9, detects an AC fundamental frequency on the basis of the acquired line voltages, and generates a signal FSEEK_SP_F indicating the detected frequency. The calculation block 155c is an adder and adds the signal VF_IPLL_OUT to the signal FSEEK_SP_F to generate the reference speed SP_RSU. This reference speed SP_RSU is used at the start time.

For example, the signal VF_IPLL_OUT generated in the above-described calculation changes by following changes in amplitudes of feedback output voltages shown as the feedback d-axis voltage ED_FBK and the feedback q-axis voltage EQ_FBK. The signal FSEEK_SP_F changes by following a change in the frequency of the fundamental wave of the feedback output voltage described above. For example, a definition may be given so that the value of the signal FSEEK_SP_F increases when the change is made in a direction in which the frequency of the fundamental wave of the feedback output voltage described above increases and the value of the signal FSEEK_SP_F decreases when the change is made in a direction in which the frequency of the fundamental wave of the feedback output voltage described above decreases. The present invention is not limited to this and a known VVVF control method may be used.

The modulation ratio-specific conversion unit 156 generates a feedback q-axis voltage EQ_FBK0 on the basis of the feedback q-axis voltage EQ_FBK and the output current I2_F. Details of the modulation ratio-specific conversion unit 156 will be described below.

The feedback voltage regulation unit 157 includes calculation blocks 157a and 157b. The calculation block 157a is a switch. The input side of the calculation block 157a is connected to the output of the modulation ratio-specific conversion unit 156 and the output side of the calculation block 157a is connected to the input of the calculation block 157b. The calculation block 157a switches ON/OFF on the basis of the restart signal B and switches between whether or not to output the signal on the input side of the calculation block 157a to the output side thereof. For example, when the logical value of the restart signal B is 0, the calculation block 157a is turned off and disconnects the input side and the output side of the calculation block 157a. When the logical value of the restart signal B is 1, the calculation block 157a is turned on and electrically connects the input side and the output side of the calculation block 157a. The calculation block 157b acquires the output of the calculation block 157a and outputs the correction signal VSM_EQ_PR corresponding thereto. Also, when the calculation block 157a is turned off, the input of the calculation block 157b is biased to an initial value PRESET and a signal having an amplitude corresponding to the initial value PRESET is output as the correction signal VSM_EQ_PR.

The magnetic flux control unit 159 generates a reference magnetic flux FL_R for controlling a magnitude of the magnetic flux of the electric motor 2. The magnetic flux control unit 159 may be configured to perform magnetic flux weakening control or the like, and may be implemented in a general method.

Figure 5:
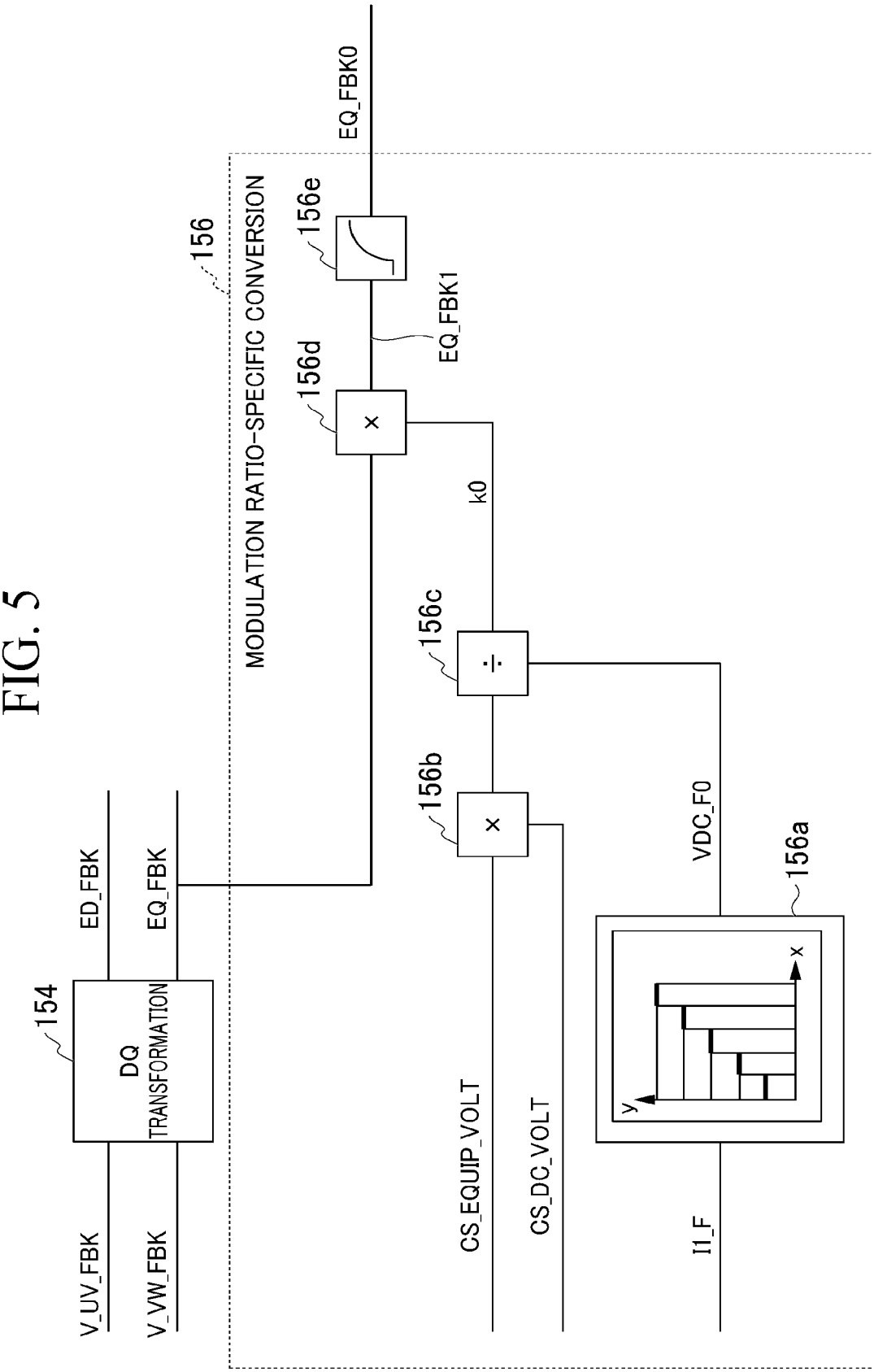
FIG. 5 is a configuration diagram of a modulation ratio conversion unit of the embodiment.

FIG. 5 is a configuration diagram of the modulation ratio-specific conversion unit 156 of the embodiment.

The modulation ratio-specific conversion unit 156 includes calculation blocks 156a to 156e.

The calculation block 156a estimates a reference DC voltage VDC_F0 for the output current I1_F on the basis of the output current I1_F. In the calculation block 156a, for example, a conversion rule for estimating the reference DC voltage VDC_F0 on the basis of the output current I1_F is predetermined. This conversion rule may be tabulated, written into software, or configured using a combination of tabulation and writing into software.

The calculation block 156b is a multiplier and multiplies the following two constant values and outputs a product thereof. The two constant values are a rated value CS_EQUIP_VOLT of the q-axis voltage and a rated value CS_DC_VOLT of the DC voltage. The calculation block 156c is a divider and the product calculated by the calculation block 156b is divided by the reference DC voltage VDC_F0 to decide on a modulation ratio k0. A relationship between the modulation ratio k0 and other variables is shown in Eq. (1).

$$k0 = ((CS\_EQUIP\_VOLT) \times (CS\_DC\_VOLT))/(VDC\_F0) \quad (1)$$

The calculation block 156d is a multiplier and calculates a feedback q-axis voltage EQ_FBK1 by multiplying the feedback q-axis voltage EQ_FBK by the modulation ratio k0. The calculation block 156e is a primary delay filter, receives the feedback q-axis voltage EQ_FBK1, and calculates a feedback q-axis voltage EQ_FBK0 by allowing frequency components having a band up to a prescribed frequency among frequency components of the feedback q-axis voltage EQ_FBK1 to pass therethrough, and attenuating frequency components exceeding this band.

Figure 6:
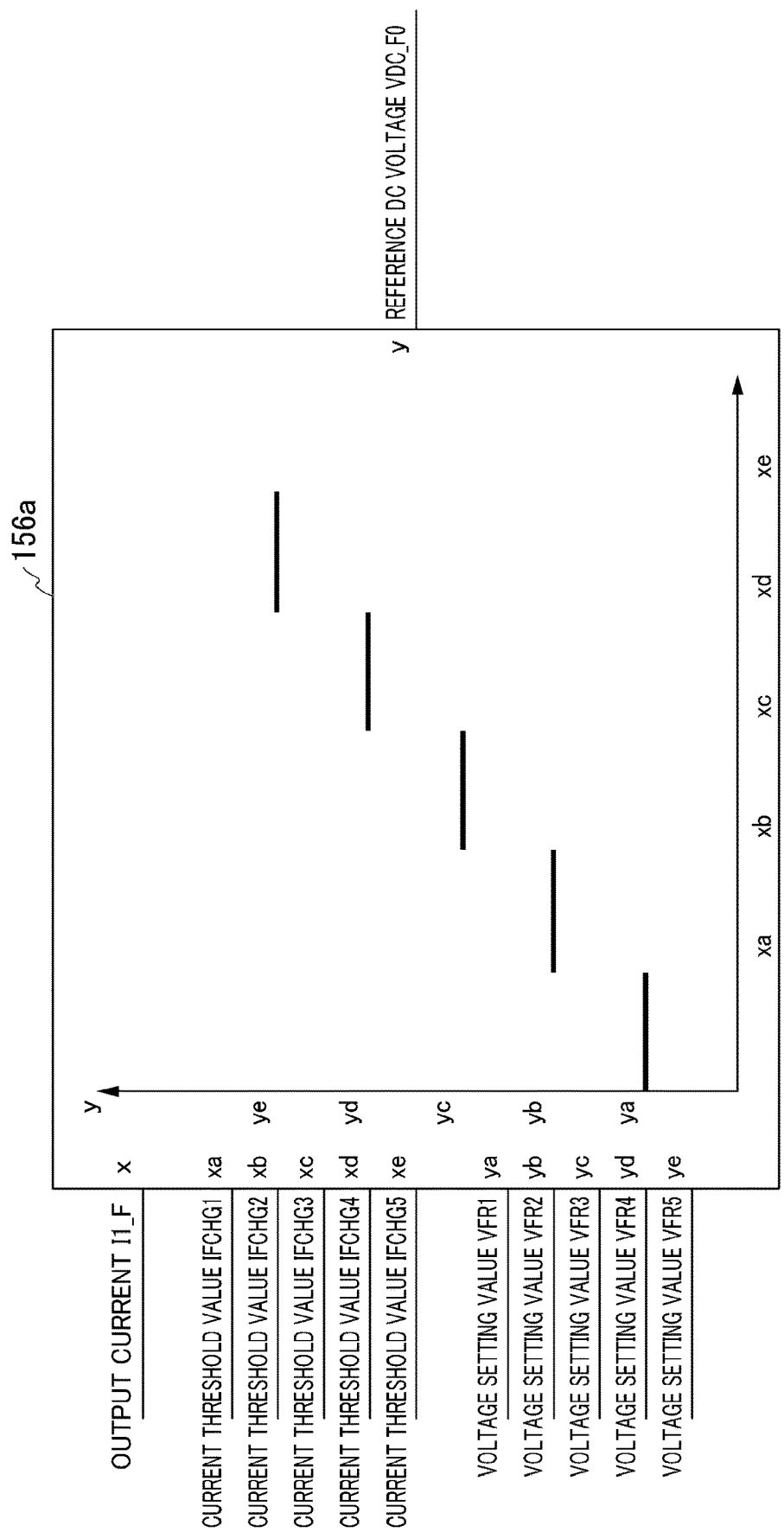
FIG. 6 is a diagram for describing a conversion rule of the embodiment.

Conversion rules related to the modulation ratio-specific conversion unit 156 of the embodiment will be described with reference to FIG. 6. FIG. 6 is a diagram for describing the conversion rules of the embodiment.

In the calculation block 156a, the output current I1_F is set as an input variable and the reference DC voltage VDC_F0 is set as an output variable. Further, current threshold values IFCHG1 to IFCHG5 and voltage setting values VFR1 to VFR5 for defining a conversion rule are set in the calculation block 156a. The calculation block 156a may hold the current threshold values IFCHG1 to IFCHG5 and the voltage setting values VFR1 to VFR5 in a table.

The conversion rules are modeled and shown in a graph. A phase current is assigned to the x-axis of this graph and a reference voltage is assigned to the y-axis. The values of the x- and y-axes correspond to the amplitude of the phase current and the amplitude of the reference voltage.

The current threshold values IFCHG1 to IFCHG5 are associated with values xa to xe of the x-axis shown in FIG. 6. In this case, each threshold value is defined to increase in the order from the current threshold value IFCHG1 to the current threshold value IFCHG5.

The voltage setting values VFR1 to VFR5 are associated with values ya to ye of the y-axis shown in FIG. 6. In this case, the voltage value of each set value is defined to increase in the order from the voltage setting value VFR1 to the voltage setting value VFR5.

As shown in this graph, when the amplitude of the output current I1_F is less than or equal to the current threshold value IFCHG1, the calculation block 156a outputs the voltage setting value VFR1 as the reference DC voltage VDC_F0. When the amplitude of the output current I1_F exceeds the current threshold value IFCHG1 and is less than or equal to the current threshold value IFCHG2, the calculation block 156a outputs the voltage setting value VFR2 as the reference DC voltage VDC_F0. When the amplitude of the output current I1_F exceeds the current threshold value IFCHG2 and is less than or equal to the current threshold value IFCHG3, the calculation block 156a outputs the voltage setting value VFR3 as the reference DC voltage VDC_F0. When the amplitude of the output current I1_F exceeds the current threshold value IFCHG3 and is less than or equal to the current threshold value IFCHG4, the calculation block 156a outputs the voltage setting value VFR4 as the reference DC voltage VDC_F0. When the amplitude of the output current I1_F exceeds the current threshold value IFCHG4 and is less than or equal to the current threshold value IFCHG5, the calculation block 156a outputs the voltage setting value VFR5 as the reference DC voltage VDC_F0.

The calculation block 156a may include a table storing fixed data for outputting the reference DC voltage VDC_F0 corresponding to the above-described conversion rule.

Figures 7, 8:
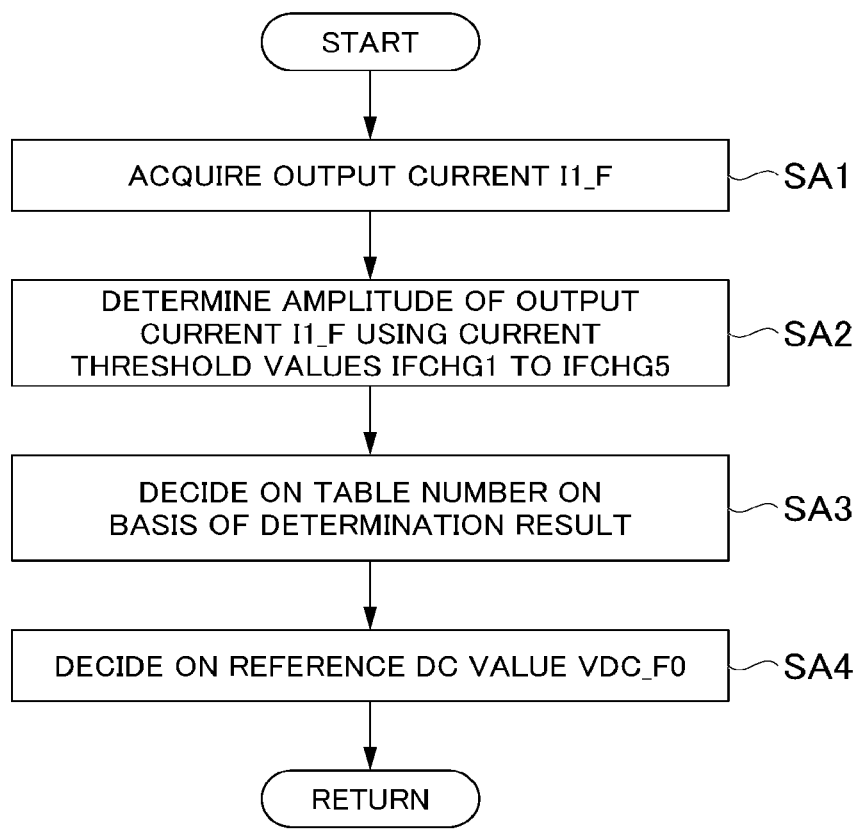
FIG. 7 is a diagram for describing a table in which conversion rules are defined according to the embodiment.
FIG. 8 is a flowchart showing a schematic procedure of a process for determining a reference direct current (DC) voltage according to the embodiment.

An example of a table in which the conversion rules of the embodiment are defined will be described with reference to FIG. 7. FIG. 7 is a diagram for describing the table in which the conversion rules of the embodiment are defined.

The items in this table include a current range, a table number iX, and a reference DC voltage. The current range item indicates each range when the amplitude of the load current is divided into a plurality of parts. The item of the table number iX is identification information for identifying the current range and the output voltage. The item of the reference DC voltage indicates a voltage setting value related to the voltage of the DC link decided on the basis of the amplitude of the load current. The voltage setting value related to the voltage of the DC link is an example of a physical quantity used as an index value and the present invention is not limited thereto.

The conversion rules defined in this table may be defined, for example, so that the amplitude of the voltage setting value related to the voltage of the DC link increases as the amplitude of the load current increases. By performing a setting process in this way, a definition can be set so that the amount of power corresponding to the voltage setting value (index value) increases.

As shown in the above-described table, the amplitude indicated by the voltage setting value (index value) may be determined to be one of a plurality of discrete values. The plurality of discrete values may be determined to be desired magnitudes and may be different from each other. According to the above-described example, the voltage setting value (index value) corresponds to the amplitude of the DC voltage of the DC link.

A process of deciding on the reference DC voltage VDC_F0 of the embodiment will be described with reference to FIG. 8.

FIG. 8 is a flowchart showing a schematic procedure of the process of deciding on the reference DC voltage VDC_F0 of the embodiment.

In the speed control unit 15, the calculation block 156a of the modulation ratio-specific conversion unit 156 acquires the output current I1_F based on a load current detected by the current sensor 8 (step SA1). The calculation block 156a determines an amplitude of the output current I1_F using the current threshold values IFCHG1 to IFCHG5 (step SA2) and determines the corresponding table number iX (step SA3). The calculation block 156a decides on the reference DC voltage VDC_F0 on the basis of the voltage value corresponding to the table number iX (step SA3) and outputs the reference DC voltage VDC_F0.

Figure 9:
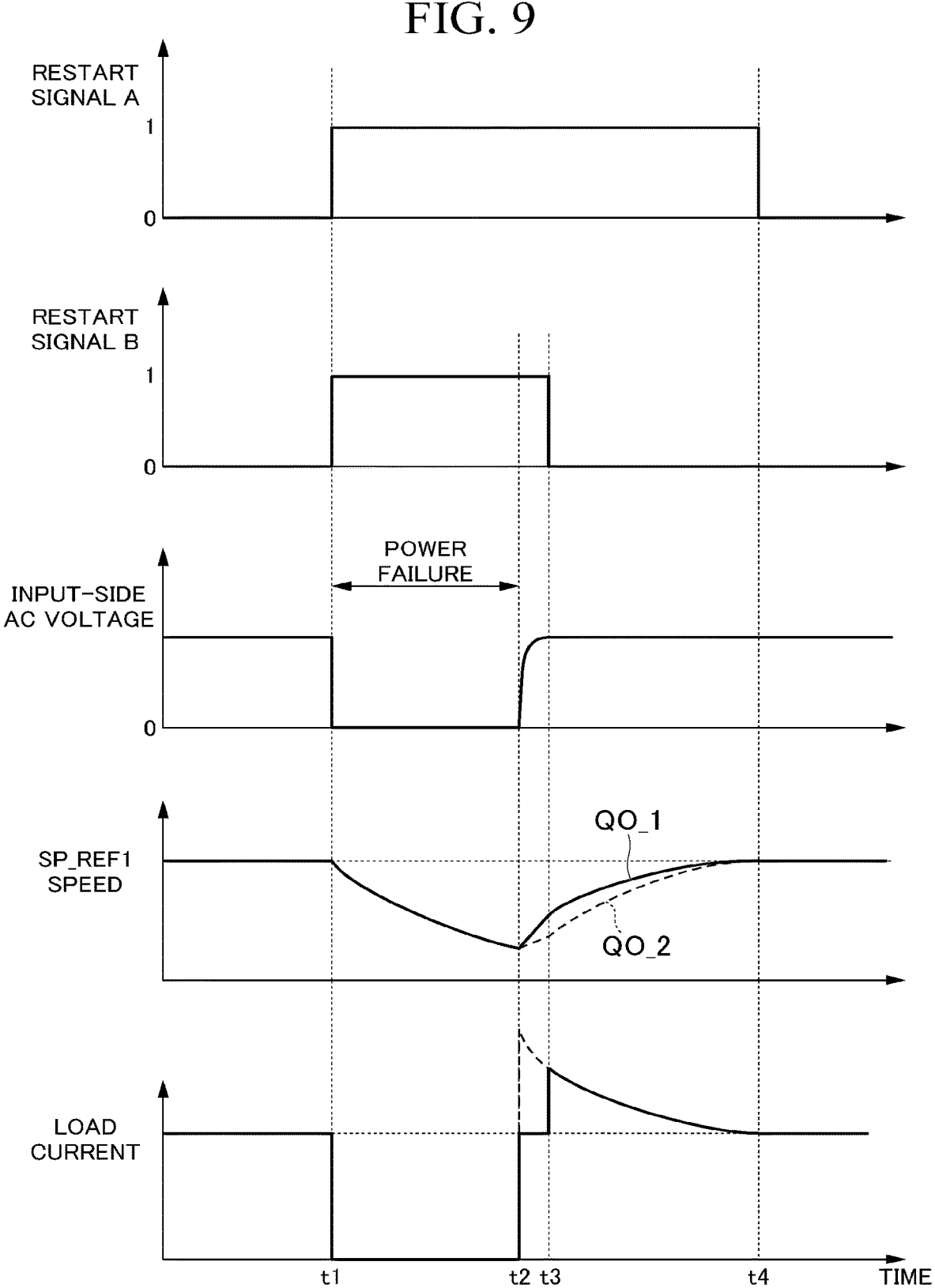
FIG. 9 is a timing chart of a case where a power failure occurs according to the embodiment.

An operation when a power failure occurs will be described with reference to FIG. 9. FIG. 9 is a timing chart of a case where a power failure occurs according to the embodiment.

In order from the upper side of FIG. 9, the restart signal A, the restart signal B, the input-side AC voltage, the speed, and the load current are arranged. The horizontal axis of FIG. 9 represents the elapse of time. The restart signal A and the restart signal B are binary logic signals, each of which has a value of 0 or 1. The input-side AC voltage shows the change in the feedback input voltage VAC detected by the instrument transformer VT. The speed indicates a change in the reference phase QO. A reference phase QO_1 and a reference phase QO_2 show two cases with different characteristics. The load current indicates a change in the load current and a change in the value of the output current F corresponding to the load current.

Until a power failure occurs at time t1, an AC voltage having a desired amplitude is supplied from the AC power supply G and the electric motor 2 is driven at a speed corresponding to the reference speed SP_REF1 on the basis of the AC voltage. Thus, the logical values of the restart signal A and the restart signal A are both 0.

For example, when the input-side AC voltage decreases and a power failure state occurs (time t1), the control unit 10 (monitoring unit 19) detects the power failure state from a detection result of the instrument transformer VT. The monitoring unit 19 sets both the logical values of the restart signal A and the restart signal B to 1. Also, the control unit 10 holds the amplitude of the load current (the value of the output current I1_F) at this timing in the registry 221 and then performs stopping the output of the load current from the inverter 6 (referred to as stopping the inverter 6). Thereby, the load current becomes 0 and the actual speed of the electric motor 2 gradually decreases.

Although the control unit 10 stops the output of the load current as described above, a control process thereof continues. For example, on the basis of amplitudes of the feedback d-axis voltage ED_FBK and the feedback q-axis voltage EQ_FBK corresponding to the line voltage when a power failure is detected, the speed control unit 15 generates the reference speed SP_RSU using low frequency components of the amplitudes. The speed control unit 15 performs a control process so that the reference voltage EQ_REF is maintained during a stop period of the inverter 6 using the reference speed SP_RSU instead of the reference speed SP_R based on the reference speed SP_REF1.

Furthermore, the speed control unit 15 decides on the reference DC voltage VDC_F0 based on the value of the output current I1_F and provides the decided reference DC voltage VDC_F0 at the time of restoration so that a restart process is performed at the modulation ratio k0 having a magnitude equivalent to that when the power failure occurs.

The control unit 10 (monitoring unit 19) detects that power has been restored at time t2 from an input-side AC voltage detection result of the instrument transformer VT. The monitoring unit 19 maintains the logical values of the restart signal A and the restart signal B at 1 and starts a timer for setting the logical value of the restart signal B to 0 when a prescribed period of time has elapsed from this point in time.

In response to the detection of this restoration, the control unit 10 causes the output of AC power from the inverter 6 to be resumed and causes the driving of the electric motor 2 by the inverter 6 to be resumed.

Also, in the case of a comparative example, in response to this, the load current may rapidly increase and the speed of the electric motor 2 may become unstable. On the other hand, because the control unit 10 of the embodiment sets both logical values of the restart signal A and the restart signal B to 1 as described above, a control state of the speed control substantially similar to that during the power failure continues.

When the timer period of the restart signal B expires at time t3, the monitoring unit 19 sets the logical value of the restart signal B to 0 in accordance with the expiration. Thereby, the speed control of the control unit 10 returns to a control system at the normal time.

However, the setting at the time of restart is maintained for rate control of the frequency correction unit 151.

Subsequently, the speed of the electric motor 2 further increases and the monitoring unit 19 detects that the speed indicated by the reference phase QO has been equivalent to the speed corresponding to the reference speed SP_REF1 (time t4). In accordance with this detection, the monitoring unit 19 sets the logical value of the restart signal A to 0 and completes the restart process.

According to the above embodiment, the control unit 10 controls an amount of power to be supplied from the main circuit 20 to the electric motor 2 after the AC power supply G is in an undervoltage state using a conversion rule in which an index value for the amplitude of the load current flowing through the plurality of windings of the electric motor 2 is defined by the main circuit 20. The control unit 10 controls the amount of power described above on the basis of the amplitude of the load current associated with the detection of the undervoltage state of the AC power supply G using the conversion rule. Thereby, because the stability of the control when the electric motor 2 is restarted at the time of restoration of the AC power supply G from the undervoltage state can be further improved, the electric motor drive device 1 can further improve the convenience when the electric motor is restarted.

Further, the control unit 10 may control the amount of power using a conversion rule in which the correspondence between the amplitude of the load current and the index value is defined. The conversion rules shown in FIG. 6 and the table shown in FIG. 7 are examples of the conversion rules described above.

The control unit 10 may control an amount of active power supplied from the main circuit 20 to the electric motor 2 on the basis of the amplitude of the load current until the undervoltage state is detected using the conversion rule.

The control unit 10 may control an amount of power that is supplied from the main circuit 20 to the electric motor 2 when the supply of AC power from the main circuit 20 to the electric motor 2 is resumed in accordance with detection of elimination of the undervoltage state by restricting the supply of the AC power from the main circuit 20 to the electric motor 2 in accordance with the detection of the undervoltage state of the AC power supply G.

Modified Example of Embodiment

A modified example of the embodiment will be described.

The present modified example may be applied when a configuration in which an FPGA 200 is used in a part or all of the modulation ratio-specific conversion unit 156 is adopted. The modified example will be described mainly using a portion of the calculation block 156a in the following description and the whole of the modulation ratio-specific conversion unit 156 may be contained in the FPGA 200.

Figure 10:
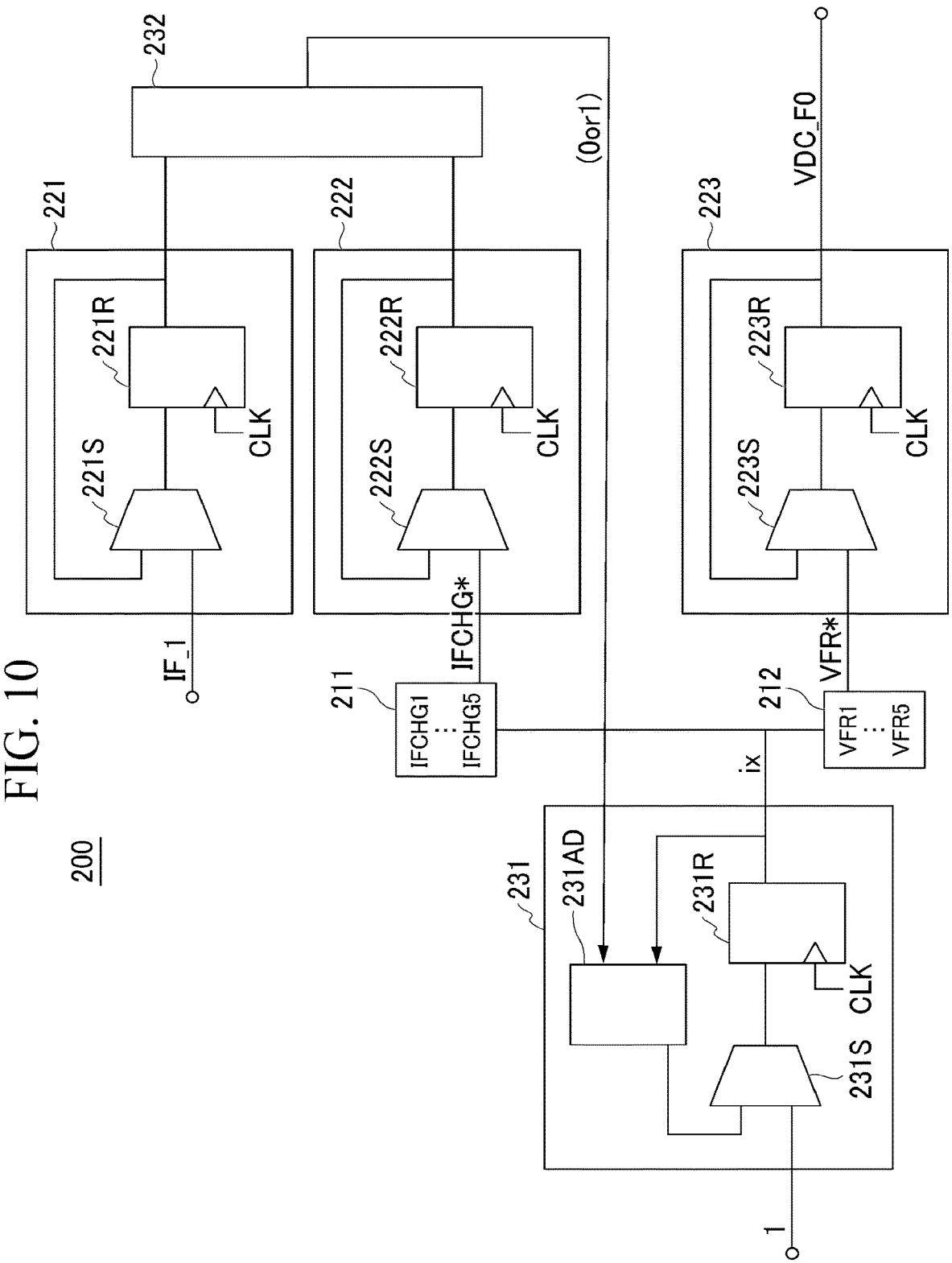
FIG. 10 is a schematic configuration diagram of an FPGA including a part of a modulation ratio conversion unit according to a modified example.

The FPGA 200 obtained by modeling a portion of the calculation block 156a that is a part of the modulation ratio-specific conversion unit 156 will be described with reference to FIG. 10. FIG. 10 is a schematic configuration diagram of the FPGA 200 including a part of the modulation ratio-specific conversion unit 156 in the modified example.

The FPGA 200 is an example of a configuration using the FPGA. For example, a table 211 (a first table), a table 212 (a second table), a registry 221 (a first variable processing unit), a registry 222 (a second variable processing unit), a registry 223 (a third variable processing unit), a table number designation unit 231, and a comparison calculation unit 232 are provided.

The table 211 is a lookup table to which current threshold values IFCHG1 to IFCHG5 are written. In the table 211, a current threshold value corresponding to the table number ix output by the table number designation unit 231 to be described below is selected from among the current threshold values IFCHG1 to IFCHG5 and the selected current threshold value is output.

The table 212 is a lookup table to which the voltage setting values VFR1 to VFR5 are written. In the table 212, a voltage setting value corresponding to the table number ix is selected from among the voltage setting values VFR1 to VFR5 and the selected voltage setting value is output.

The registry 221 writes and holds the output current I1_F at a timing when a prescribed condition is satisfied. For example, the registry 221 includes a selector 221S and a storage area 221R. The selector 221S performs a switching process between the output current I1_F that is externally supplied and a signal from the output of the storage area 221R at a prescribed timing within a control period and supplies a switching result to an input of the storage area 221R.

The timing when the prescribed condition is satisfied may be associated with a timing when it is detected that the AC power supply G is in an undervoltage state. For example, the above-described timing may be synchronized with a timing of the detection of the undervoltage state of the AC power supply G.

The registry 222 holds any value (IFCHG*) of the current threshold values IFCHG1 to IFCHG5 read from the table 211. For example, the registry 222 includes a selector 222S and a storage area 222R. The selector 222S performs a switching process between the signal (IFGHG*) supplied from the table 211 and the signal from the output of the storage area 222R at a prescribed timing within the control period and supplies a switching result to the input of the storage area 222R.

The registry 223 holds any value (VFR*) from the voltage setting values VFR1 to VFR5 read from the table 212 and outputs the held value as a reference DC voltage VDC_F0.

Also, the selectors 221S, 222S, 223S, and 231S may perform switching processes according to synchronized signals or may perform switching processes according to set signals so that a prescribed time difference occurs therebetween. Each of the storage areas 221R, 222R, 223R, and 231R acquires and updates a value of an input and supplied signal according to a synchronized clock signal CLK.

The table number designation unit 231 generates a table number ix for referring to the tables 211 and 212. When an initial value of 1 is set as the table number ix, the table number designation unit 231 holds the initial value of 1.

For example, the table number designation unit 231 includes a selector 231S, a storage area 231R, and an adder 231AD. The selector 231S performs a switching process between a signal indicating the initial value of 1 and a signal indicating the calculation result of the adder 231AD at a prescribed timing within a control period and supplies a switching result to the input of the storage area 231R. The adder 231AD adds a logical value (0 or 1) output by the comparison calculation unit 232 to be described below to the output of the storage area 231R.

The table number designation unit 231 adds 1 to the held table number ix when a determination result of the comparison calculation unit 232 is 0 indicating a negative result, whereas the table number designation unit 231 maintains and holds the value of the held table number ix when the determination result of the comparison calculation unit 232 is 1 indicating a positive result.

The comparison calculation unit 232 compares an output value of the registry 221 with an output value of the registry 222 and outputs a comparison result. For example, the comparison calculation unit 232 outputs 0 when the output value of the registry 221 is less than or equal to the output value of the registry 222 and outputs 1 otherwise.

Figure 11A:
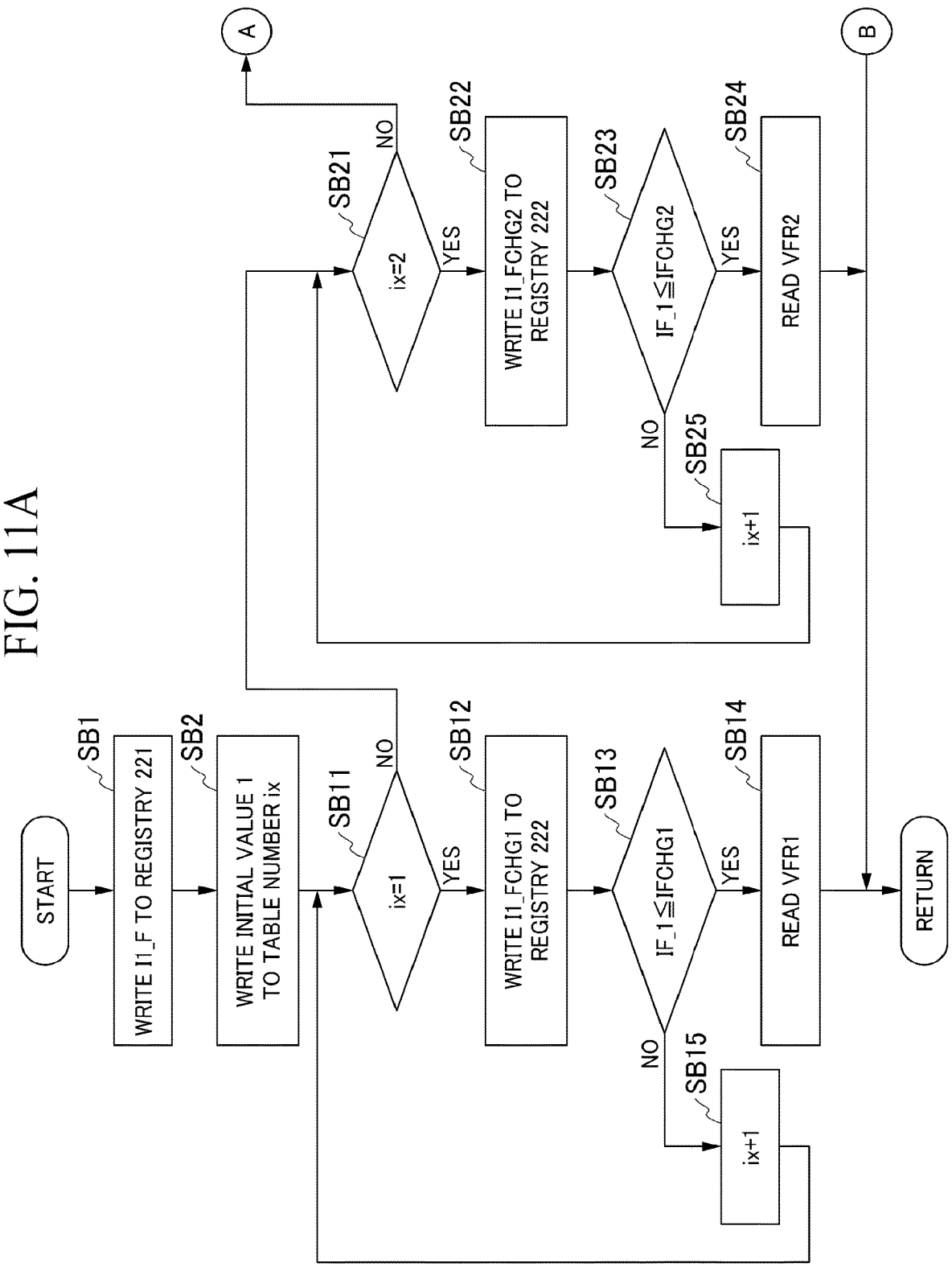
FIG. 11A is a flowchart showing a process in which the FPGA decides on a reference DC voltage VDC_F0 according to the modified example.
Figure 11B:
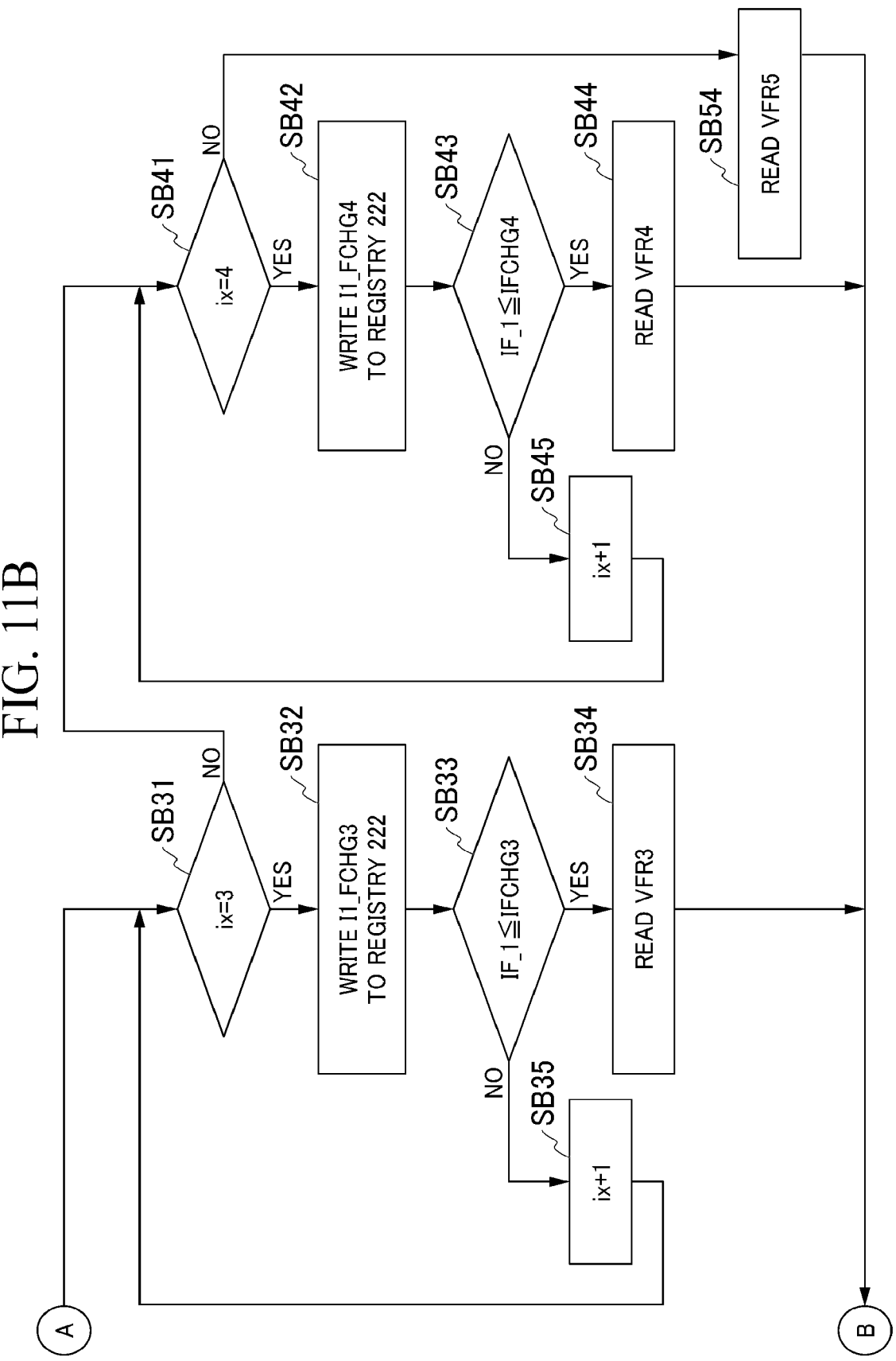
FIG. 11B is a flowchart showing a process in which the FPGA decides on a reference DC voltage VDC_F0 according to the modified example.

FIGS. 11A and 11B are flowcharts showing a process in which the FPGA 200 of the modified example determines the reference DC voltage VDC_F0.

The registry 221 writes the output current I1_F at the timing allowed as described above (step SB1).

The table number designation unit 231 writes an initial value of 1 as table number ix to the storage area 231R and holds the written initial value of 1 (step SB2).

The table number designation unit 231 determines whether or not the table number ix is 1 (step SB11).

When the table number ix is 1, the table 211 outputs the current threshold value IFCHG1 which is referred to according to the table number ix. The registry 222 reads the current threshold value IFCHG1 from the table 211, writes the current threshold value IFCHG1 to the storage area 222R, and holds the written current threshold value IFCHG1 (step SB12).

The comparison calculation unit 232 determines whether or not the output value of the registry 221 is less than or equal to the output value of the registry 222 (step SB13).

When the output value of the registry 221 is less than or equal to the output value of the registry 222, the table 212 outputs the voltage setting value VFR1 that is referred to according to the table number ix. The registry 223 reads the voltage setting value VFR1 from the table 212 (step SB14).

When the output value of the registry 221 exceeds the output value of the registry 222, the table number designation unit 231 adds 1 to the table number ix, writes an addition result to the storage area 231R, and updates a value of the table number ix (step SB15), and moves the process to step SB11.

When the table number ix is not 1, the process from step SB21 is executed. The table number designation unit 231 determines whether or not the table number ix is 2 (step SB21).

When the table number ix is 2, the table 211 outputs the current threshold value IFCHG2 that is referred to according to the table number ix. The registry 222 reads the current threshold value IFCHG2 from the table 211, writes the current threshold value IFCHG2 to the storage area 222R, and holds the written current threshold value IFCHG2 (step SB22).

The comparison calculation unit 232 determines whether or not the output value of the registry 221 is less than or equal to the output value of the registry 222 (step SB23).

When the output value of the registry 221 is less than or equal to the output value of the registry 222, the table 212 outputs the voltage setting value VFR2 that is referred to according to the table number ix. The registry 223 reads the voltage setting value VFR2 from the table 212 (step SB24).

When the output value of the registry 221 exceeds the output value of the registry 222, the table number designation unit 231 adds 1 to the table number ix, writes an addition result to the storage area 231R, and updates the value of the table number x (step SB25), and moves the process to step SB21.

When the table number ix is not 2, the process from step SB31 (FIG. 11B) is executed. The table number designation unit 231 determines whether or not the table number ix is 3 (step SB31).

When table number ix is 3, the table 211 outputs the current threshold value IFCHG3 that is referred to according to the table number ix. The registry 222 reads the current threshold value IFCHG3 from the table 211, writes the current threshold value IFCHG3 to the storage area 222R, and holds the written current threshold value IFCHG3 (step SB32).

The comparison calculation unit 232 determines whether or not the output value of the registry 221 is less than or equal to the output value of the registry 222 (step SB33).

When the output value of the registry 221 is less than or equal to the output value of the registry 222, the table 212 outputs the voltage setting value VFR3 that is referred to according to the table number ix. The registry 223 reads the voltage setting value VFR3 from the table 212 (step SB34).

When the output value of the registry 221 exceeds the output value of the registry 222, the table number designation unit 231 adds 1 to the table number ix, writes an addition result to the storage area 231R, and updates the value of the table number x (step SB35), and moves the process to step SB31.

When the table number ix is not 3, the process from step SB41 is executed. The table number designation unit 231 determines whether or not the table number ix is 4 (step SB41).

When the table number ix is 4, the current threshold value IFCHG4 which is referred to according to the table number ix is output in the table 211. The registry 222 reads the current threshold value IFCHG4 from the table 211, writes the current threshold value IFCHG4 to the storage area 222R, and holds the written current threshold value IFCHG4 (step SB42).

The comparison calculation unit 232 determines whether or not the output value of the registry 221 is less than or equal to the output value of the registry 222 (step SB43).

When the output value of the registry 221 is less than or equal to the output value of the registry 222, the table 212 outputs the voltage setting value VFR4 that is referred to according to the table number ix. The registry 223 reads the voltage setting value VFR4 from the table 212 (step SB44).

When the output value of the registry 221 exceeds the output value of the registry 222, the table number designation unit 231 adds 1 to the table number ix, writes an addition result to the storage area 231R, and updates the value of the table number x (step SB45), and moves the process to step SB41.

When the table number ix is not 4, the voltage setting value VFR5, which is referred to according to the table number ix, is output in the table 212. The registry 223 reads the voltage setting value VFR5 from the table 212 (step SB54).

After the processing of any of step SB14, step SB24, step SB34, step SB44, and step SB54 is completed, the registry 223 outputs any one of the read voltage setting values VFR1 to VFR5 as the reference DC voltage VDC_F0 (step SB61).

According to this modified example, the table 211 holds a plurality of current threshold values different from each other. The table 212 holds a plurality of voltage setting values different from each other. The registry 221 holds a value of the load current (the output current I1_F) at a timing associated with detection of the undervoltage state of the AC power supply G. The registry 222 holds any of the plurality of current threshold values held in the table 211. On the basis of a difference between the value of the load current held by the registry 221 and the current threshold value held by the registry 222, the registry 223 can decide on one voltage setting value from among the plurality of voltage setting values held in the table 212, such that it is possible to configure the calculation block 156a using a relatively small-scale FPGA 200 and to have effects similar to those of the embodiment.

According to at least the above embodiment, the electric motor drive device 1 includes the electric motor 2, the main circuit 20, the current sensor 8, and the control unit 10. The electric motor 2 has a plurality of windings. The main circuit 20 transforms power of the AC power supply G into AC power and supplies the AC power to each of the plurality of windings. The current sensor 8 detects a load current flowing through each of the plurality of windings. The control unit 10 controls the main circuit 20 on the basis of a current value detected by the current sensor 8. Further, the control unit 10 controls an amount of power to be supplied from the main circuit 20 to the electric motor 2 on the basis of an amplitude of the load current associated with detection of an undervoltage state of the AC power supply in a state in which the main circuit 20 uses a conversion rule in which an index value for the amplitude of the load current flowing through the plurality of windings is defined. Thereby, the electric motor drive device 1 can further enhance the convenience when the electric motor 2 is restarted.

At least a part of the control unit 10 of the electric motor drive device 1 may be implemented with a software functional unit that functions by a processor such as a CPU executing a program, and all of the control unit 10 of the electric motor drive device 1 may be implemented by a hardware functional unit such as an LSI circuit.

While several embodiments of the present invention have been described above, these embodiments have been presented by way of example only, and are not intended to limit the scope of the inventions. These embodiments may be embodied in a variety of other forms. Various omissions, substitutions, and changes may be made without departing from the spirit of the inventions. The inventions described in the appended claims and their equivalents are intended to cover such embodiments or modifications as would fall within the scope and spirit of the inventions.

A case in which the undervoltage state of the AC power supply G is detected and the modulation ratio k0 at the start of the electric motor 2 is controlled on the basis of an amplitude of the load current at a detection timing has been described in the description of the above-described embodiment. On the other hand, the timing for identifying the amplitude of the load current may be a timing immediately before the AC power supply G is in the undervoltage state. In this case, the speed control unit 15 may be configured so that the value of the load current may be sampled periodically and iteratively regardless of the presence or absence of the undervoltage state of the AC power supply G and furthermore the above-described periodic sampling is not performed within the period of the undervoltage state of the AC power supply G. Thereby, the speed control unit 15 (the registry 221) can use the value of the output current I1_F immediately before a power failure occurs.

REFERENCE SIGNS LIST

1 Electric motor drive device
G AC power supply
2 Electric motor
3 Transformer
4 Rectifier
5 Capacitor
6 Inverter
7 DC voltage sensor
8 Current sensor
9 AC voltage sensor
10 Control unit
15 Speed control unit (ASR)
20 Main circuit
VT Instrument transformer

The invention claimed is:

1. An electric motor drive device comprising:
an electric motor having a plurality of windings;
a main circuit configured to transform power of an alternating current (AC) power supply into AC power and supply the AC power to each of the plurality of windings;
a current sensor configured to detect a load current flowing through each of the plurality of windings; and
a control unit configured to control the main circuit on the basis of a current value detected by the current sensor,
wherein the control unit controls an amount of power to be supplied from the main circuit to the electric motor on the basis of an amplitude of the load current associated with detection of an undervoltage state of the AC power supply in a state in which the main circuit uses a conversion rule in which an index value for the amplitude of the load current flowing through the plurality of windings is defined.

2. The electric motor drive device according to claim 1, wherein the control unit controls the amount of power using the conversion rule in which a corresponding relationship between the amplitude of the load current and the index value is defined.

3. The electric motor drive device according to claim 1, wherein the control unit controls an amount of active power to be supplied from the main circuit to the electric motor on the basis of the amplitude of the load current until the undervoltage state is detected using the conversion rule.

4. The electric motor drive device according to claim 1, wherein the conversion rule is defined so that an amount of power corresponding to the index value increases as an amplitude of the load current increases.

5. The electric motor drive device according to claim 4, wherein an amplitude indicated by the index value is decided by any one of a plurality of discrete values determined for each desired amplitude.

6. The electric motor drive device according to claim 1, wherein the index value corresponds to an amplitude of a direct current (DC) voltage.

7. The electric motor drive device according to claim 1, wherein the control unit controls an amount of power that is supplied from the main circuit to the electric motor when the supply of AC power from the main circuit to the electric motor is resumed in accordance with detection of elimination of the undervoltage state by restricting the supply of the AC power from the main circuit to the electric motor in accordance with the detection of the undervoltage state of the AC power supply.

8. The electric motor drive device according to claim 1, wherein the control unit includes:
a first table holding a plurality of current threshold values different from each other;
a second table holding a plurality of voltage setting values different from each other;
a first variable processing unit holding a value of the load current at a timing associated with the detection of the undervoltage state of the AC power supply;
a second variable processing unit holding any of the plurality of current threshold values held in the first table; and
a third variable processing unit configured to decide on one voltage setting value from among the plurality of voltage setting values held in the second table on the basis of a difference between the value of the load current held by the first variable processing unit and the current threshold value held by the second variable processing unit.

* * * * *